(12) United States Patent
Florin et al.

(10) Patent No.: US 9,759,590 B2
(45) Date of Patent: Sep. 12, 2017

(54) MAGNETIC-INDUCTIVE FLOW METER AND METHOD FOR OPERATING A MAGNETIC-INDUCTIVE FLOW METER

(71) Applicant: KROHNE MESSTECHNIK GMBH & CO. KG, Duisburg (DE)

(72) Inventors: Wilhelm Florin, Duisburg (DE); Markus Dabrowski, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 42 days.

(21) Appl. No.: 14/787,656

(22) PCT Filed: Jul. 29, 2014

(86) PCT No.: PCT/EP2014/002064
§ 371 (c)(1),
(2) Date: Oct. 28, 2015

(87) PCT Pub. No.: WO2015/014479
PCT Pub. Date: Feb. 5, 2015

(65) Prior Publication Data
US 2016/0178419 A1    Jun. 23, 2016

(30) Foreign Application Priority Data

Jul. 29, 2013  (DE) .................. 10 2013 012 435
Sep. 24, 2013  (DE) .................. 10 2013 015 818

(51) Int. Cl.
*G01F 1/58* (2006.01)
*G01F 1/60* (2006.01)

(52) U.S. Cl.
CPC ............... *G01F 1/588* (2013.01); *G01F 1/60* (2013.01)

(58) Field of Classification Search
CPC .................................................... G01F 1/58
USPC ........................................ 73/861.11, 861.12
See application file for complete search history.

(56) References Cited

U.S. PATENT DOCUMENTS

| 4,144,751 | A | 3/1979 | Yokoyama | |
|---|---|---|---|---|
| 4,204,240 | A | 5/1980 | Schmoock | |
| 4,784,000 | A * | 11/1988 | Gaertner | G01F 1/60 361/154 |
| 6,453,754 | B1 * | 9/2002 | Florin | G01F 1/60 73/861 |
| 6,477,070 | B2 | 11/2002 | Schweitzer | |
| 7,310,582 | B2 | 12/2007 | Ishikawa | |

OTHER PUBLICATIONS

International Search Report completed on Dec. 17, 2014 for corresponding Appl. No. PCT/EP2014/002064.

* cited by examiner

*Primary Examiner* — Jewel V Thompson
(74) *Attorney, Agent, or Firm* — David S. Safran

(57) ABSTRACT

A magnetic field generator (1) of a magnetic-inductive flowmeter for generating an alternating magnetic field running at least also perpendicular to the longitudinal axis of a measuring tube, wherein at least one field coil (2), a current regulator (3), a switching bridge (4) and a microcontroller (5) all form part of the magnetic field generator (1).
Two different coil voltages are provided for the coil power supply, namely an initial voltage and a lower operating voltage, and a voltage selector (6) is provided for switching from the initial voltage to the operating voltage—and vice versa.

7 Claims, 3 Drawing Sheets

MAGNETIC-INDUCTIVE FLOW METER AND METHOD FOR OPERATING A MAGNETIC-INDUCTIVE FLOW METER

BACKGROUND OF THE INVENTION

Field of the Invention

The invention relates to a magnetic-inductive flowmeter having at least one measuring tube for the flow of an electrically conductive medium, having at least one magnetic field generator for generating an alternating magnetic field running at least also perpendicular to the longitudinal axis of the measuring tube, having at least two measuring electrodes—in particular being in contact with the medium—and having an evaluating circuit, wherein the magnetic field generator has at least one field coil, preferably one current regulator, preferably one switching bridge and preferably one microcontroller. The invention also relates to a method for operating a magnetic-inductive flowmeter.

Description of Related Art

A magnetic-inductive flowmeter of the above-described type is known from DE 199 07 864 A1 and corresponding U.S. Pat. No. 6,453,754. The magnetic field generator can have a field coil or two field coils in this known magnetic-inductive flowmeter. This is the reason that it is described above that the magnetic field generator has at least one field coil. The magnetic field generator of the known magnetic-inductive flowmeter also has a current regulator, a switching bridge and a microcontroller. However, because neither a current regulator, nor a switching bridge, nor a microcontroller is functionally required, it is described above that the magnetic field generator has preferably one current regulator, preferably one switching bridge and preferably one microcontroller.

Magnetic-inductive flowmeters have been known extensively for decades. Reference is thus made, as an example, to the citation "Technische Durchflussmessung" by Prof. Dr.-Ing. K. W. Bonfig, $3^{rd}$ edition, Vulkan-Verlag Essen, 2002, pages 123 to 167 and also to the citation "Grundlagen Magnetisch-Induktive Durchflussmessung" by Dipl.-Ing. Friedrich Hoffmann, $3^{rd}$ edition, 2003, publication of the company KROHNE Messtechnik GmbH & Co. KG.

The basic principle of a magnetic-inductive flowmeter for flow measurement of a flowing medium goes back to Michael Faraday, who proposed, in 1832, the use of the principle of electromagnetic induction for measuring the flow velocity of an electrically conductive medium.

According to Faraday's law of induction, electric field strength is formed perpendicular to the direction of flow of the medium and perpendicular to the magnetic field in a flowing, electrically conductive medium interfused by a magnetic field. Faraday's law of induction is thus exploited in magnetic-inductive flowmeters in that a magnetic field fluctuating over time during the measurement process is usually generated by means of a magnetic field generator usually having at least one magnetic field coil, and that the magnetic field at least partially interfuses the electrically conductive medium flowing through the measuring tube. Here, the generated magnetic field has at least one component perpendicular to the longitudinal axis of the measuring tube or perpendicular to the direction of flow of the medium.

If it is mentioned above that the magnetic-inductive flowmeter being discussed here has at least one magnetic field generator "for generating a magnetic field running perpendicular to the longitudinal axis of the measuring tube", then it should also be mentioned here that the magnetic field preferably runs perpendicular to the longitudinal axis of the measuring tube or perpendicular to the direction of flow of the medium, however, it is sufficient when a component of the magnetic field runs perpendicular to the longitudinal axis of the measuring tube or perpendicular to the direction of flow of the medium.

It is also described above that the magnetic-inductive flowmeter being discussed here also has at least two measuring electrodes for tapping a measuring voltage induced in a flowing medium, wherein the measuring electrodes preferably come into contact with the medium. Preferably, the virtual connection line of the two measuring electrodes runs at least essentially perpendicular to the direction of the magnetic field interfusing the measuring tube perpendicular to the longitudinal axis of the measuring tube. In particular, the measuring electrodes can be provided in such a manner that their virtual connection line actually runs—more or less—perpendicular to the direction of the magnetic field interfusing the measuring tube.

Finally, it is described above that the measuring electrodes are, in particular, such that they come into contact with the medium. Indeed, of course, the electric field strength generated by induction in the flowing, electrically conductive medium can be tapped by direct, i.e., galvanic, measuring electrodes in contact with the medium as a measuring voltage. However, there are magnetic-inductive flowmeters in which the measuring voltage is not tapped by direct, i.e., non-galvanic, measuring electrodes in contact with the medium, rather the measuring voltage is capacitively determined.

Magnetic-inductive flowmeters in the industrial sector were initially operated using an alternating magnetic field. For financial reasons, the field coil or field coils is/are connected to the existing AC voltage supply, so that the magnetic field changes its field strength essentially sinusoidally. The operating of magnetic-inductive flowmeters with a magnetic field that changes its field strength essentially sinusoidally, however, has disadvantages (see DE 199 07 864 A1, column 1, line 53 to column 2, line 13, and paragraph spanning columns 1 & 2 of corresponding U.S. Pat. No. 6,453,754).

Since the middle of the 70s, magnetic-inductive flowmeters operating with a switched constant magnetic field have established themselves, in which switched direct current is used as coil current. If a switched constant magnetic field is used, disadvantages are avoided that occur when a magnetic field is used, however, there are also problems involved with using a switched constant magnetic field (compare DE 199 07 864 A1, column 2, lines 18 to 41 and second full paragraph of corresponding U.S. Pat. No. 6,453,754).

The invention that is described in DE 199 07 864 A1 and corresponding U.S. Pat. No. 6,453,754 has the object of designing and further developing the known magnetic-inductive flowmeter operating with a switched constant magnetic field in that the described, system-related switchover phases are shorter than in the magnetic-inductive flowmeters previously known from the prior art, so that the field frequency, i.e., the frequency at which the constant magnetic field is switched, can be increased (compare DE 199 07 864 A1, column 2, lines 42 to 49 and first paragraph of the Summary of the Invention of corresponding U.S. Pat. No. 6,453,754).

In detail, an additional current source is provided in the known magnetic-inductive flowmeter and, by means of the additional current source, an additional current can be fed into the field coil or into the field coils immediately at the beginning of each half cycle of the coil current, presently switched constant current (see, DE 199 07 864 A1, column 2, lines 50 to 57, and second paragraph of the Summary of the Invention of corresponding U.S. Pat. No. 6,453,754).

Of course, there are magnetic-inductive flowmeters of very different nominal sizes and having very different constructional geometries. This leads to the electrical characteristics of the field coil or field coils being very different from one another, in particular the inductance and the resistance of the field coils used for different magnetic-inductive flowmeters. Thus, the time constants of the field coil dependent on the ratio of inductance to resistance are very different.

If one does not want to design a coil current supply for each magnetic-inductive flowmeter having a different nominal size, then a coil current supply that can be used for the very different field coils should be designed so that, for example, the desired current can flow, even at a relatively large resistance, and so that, at a relatively large inductance and a relatively small resistance, the settling time dependent on the time constants is not too large. Thus, the object of the invention is to provide a magnetic-inductive flowmeter in which a certain coil supply current for otherwise very different magnetic-inductive flowmeters can be used, namely, in particular, for magnetic-inductive flowmeters having very different field coils and/or with very different demands on the required field strength.

SUMMARY OF THE INVENTION

The magnetic-inductive flowmeter according to the invention is initially and essentially characterized in that two different coil voltages are provided for coil power supply, namely an initial voltage and a lower operating voltage, and that a voltage selector is provided for switching from the initial voltage to the operating voltage—and vice versa. This requires explanation:

It is explained above that an additional current source is provided in the known magnetic-inductive flowmeter on which the invention is based and, by means of the additional current source, immediately, at the beginning of each half cycle of coil current, presently switched constant current, an additional current is supplied into the field coil or field coils; this leads to the desired shortening of the settling time (compare FIG. 4 in DE 199 07 864 A1 and corresponding U.S. Pat. No. 6,453,754).

The settling time is also shortened in the magnetic-inductive flowmeter according to the invention—at otherwise unchanged conditions—namely in that, first, an initial voltage and then a lower operating voltage is provided. The initial voltage is thus greater than the operating voltage, wherein the operating voltage is the voltage that is required for the actual measuring operation, which, thus, allows the—constant—coil current to flow, which leads to the desired magnetic field strength in the measuring tube or in the medium flowing through the measuring tube. According to the invention, however, more than just a shortening of the settling time is achieved. This is explained further below.

It is essential for the magnetic-inductive flowmeter according to the invention that the initial voltage is greater than the operating voltage. Thus, the operating voltage can be relatively small, namely when the resistance of the field coil or the field coils is relatively small and/or the coil current—defining the required magnetic field strength—is relatively low. The required operating voltage can, however, be relatively large, namely when the resistance of the field coil or field coils is relatively large and/or the required coil current—due to the demanded magnetic field strength—is relatively large. In the magnetic-inductive flowmeter according to the invention, thus, the coil power supply must be configured overall, so that the stipulation that the initial voltage is greater than the operating voltage can be fulfilled, even at the greatest operating voltage that could be required in individual cases.

Taking into consideration what is described above, the coil power supply can be implemented in very different manners in the magnetic-inductive flowmeter according to the invention. In particular, supply voltage available for the magnetic-inductive flowmeter according to the invention can be the initial voltage. In particular, in this case, and only in this case, the operating voltage can be obtained using pulse width modulation from the supply voltage. In this case, but only in this case, a PWM-operated switching regulator can be provided for generating the operating voltage.

It is described above that a switching bridge can be provided in the magnetic-inductive flowmeter according to the invention for generating a switched constant magnetic field and thus for generating a switched constant current as coil current—and such a switching bridge is also provided in the known magnetic-inductive flowmeter forming the basis of the invention (see, the switching bridge 13 in FIG. 3 of DE 199 07 864 A1 and corresponding U.S. Pat. No. 6,453, 754). If a switching bridge is also provided in the magnetic-inductive flowmeter according to the invention, additionally also a microcontroller (see, microcontroller 18 in the magnetic-inductive flowmeter known from DE 199 07 864 A1 and corresponding U.S. Pat. No. 6,453,754), then an embodiment of the magnetic-inductive flowmeter according to the invention is recommended that is characterized in that the switching bridge is actuated by the microcontroller.

If a microcontroller is provided in the magnetic-inductive flowmeter according to the invention, in which, as described above, the switching bridge can be actuated, then, but not only then, it is recommended to actuate the voltage selector with the microcontroller.

It is mentioned further above, that, according to the invention, not only the settling time is shortened, that more is achieved according to the invention. It is essential for the magnetic-inductive flowmeter according to the invention, as mentioned a number of times, that two different coil voltages are provided, namely an initial voltage and a lower operating voltage. Since the initial voltage is greater than the operating voltage, the initial voltage has to be chosen so that it is greater than the maximum required operating voltage, i.e., the operating voltage needed for the required coil current when the resistance of the field coil or the field coils is relatively large and when—due to the demanded magnetic field strength—a relatively large coil current needs to flow. If the coil power supply is implemented in this manner, however, a smaller operating voltage than the maximum operating voltage, in particular a relatively small operating voltage, is needed and the power not "used" in the field coil or field coils is then "used" in the current regulator, namely as unwanted power loss. This is prevented according to the invention, on the one hand, in that an initial voltage is provided that implements a desired, short settling time, and, on the other hand, only such operating voltage is provided that is functionally necessary for the respective individual case.

If a microcontroller is provided in the magnetic-inductive flowmeter according to the invention, as in the magnetic-inductive flowmeter on which the invention is based, and as is typical today, then the microcontroller can have three functions in the magnetic-inductive flowmeter according to the invention, namely the function of actuating the switching bridge, the function of actuating the voltage selector and the function of actuating or controlling the operating voltage. The microcontroller, then, does not only specify when to switch from the initial voltage to the operating voltage—and vice versa—, but also which operating voltage is available at the field coil or field coils.

Of course, in addition to the designs and further developments already described for the magnetic-inductive flowmeter according to the invention, further designs and developments, as well as modifications are possible.

It is described above, that the initial voltage in the magnetic-inductive flowmeter according to the invention can be the supply voltage. However, a design can be worthwhile, in which the initial voltage is, namely, obtained from the supply voltage, but is not directly the supply voltage. Thus, the initial voltage can be obtained using pulse width modulation from the supply voltage, in a manner comparable to the operating voltage, a PWM-operated switch regulator can also be provided insofar for generating the initial voltage.

In known magnetic-inductive flowmeters, on which the invention is based, a current regulator, as already mentioned, is provided (current regulator 11 in FIG. 3 of DE 199 07 864 A1 corresponding U.S. Pat. No. 6,453,754). Such a current regulator, as designed here, is generally provided in the magnetic-inductive flowmeter according to the invention. However, instead of a current regulator, a current-measuring resistor can be provided. The coil current through the field coil or field coils is then proportional to the operating voltage. In this design, the actual flowing coil current has to be measured, namely with the help of the current-measuring resistor, so that it can be mathematically taken into consideration in determining the flow.

If a current-measuring resistor is provided instead of a current regulator in the magnetic-inductive flowmeter according to the invention, then the voltage drop at the current-measuring resistor proportional to the coil current can be used as reference voltage, i.e., the flow can be determined from the measuring electrode voltage at the measuring electrodes and the reference voltage.

Additionally, it can be practical to synchronize the timing of the PMW signal to the timing of measurement of the measuring electrode voltage in the magnetic-inductive flowmeter according to the invention. Thereby, the timing of the PWM signal can correspond to the timing of measurement of the measuring electrode voltage; however, the timing of the PMW signal can also easily correspond to an n-fold of the timing of measurement of the measuring electrode voltage, wherein n is preferably a whole number greater than zero.

A preferred functioning of the magnetic-inductive flowmeter according to the invention can be described as follows:

The microcontroller detects the voltage drop via the current regulator or, if a current-measuring resistor is provided instead of a current regulator, via the current-measuring resistor and determines, independent thereof, the point in time of switching of the voltage selector and the setting of the PWM-controlled switch regulator, i.e., the setting of the operating voltage.

The magnetic-inductive flowmeter according to the invention operates insofar in pulses in that measurement follows a measuring break, following the break comes another measurement, then a measuring break and a measurement, and so on. This is described further below.

As mentioned in the introduction, the invention relates to a method for operating a magnetic-inductive flowmeter. This method is characterized in a magnetic-inductive flowmeter according to the type described in the introduction in that two different coil voltages are provided for coil power supply namely an initial voltage and a lower operating voltage and that a voltage selector is used for switching from the initial voltage to the operating voltage—and vice versa. Thus, the course of action can be taken in detail as described above in conjunction with the magnetic-inductive flowmeter according to the invention. In particular, when, instead of a current regulator, a current-measuring resistor is provided in series with the field coil or field coils, the voltage drop occurring at the current-measuring resistor is used as reference voltage and the flow is determined from the measuring electrode voltage at the measuring electrodes and the reference voltage.

As described, there are various possibilities for designing and further developing the magnetic-inductive flowmeter according to the invention as will be apparent from the following description in conjunction with the accompanying drawings.

DETAILED DESCRIPTION OF THE INVENTION

Figure 5:
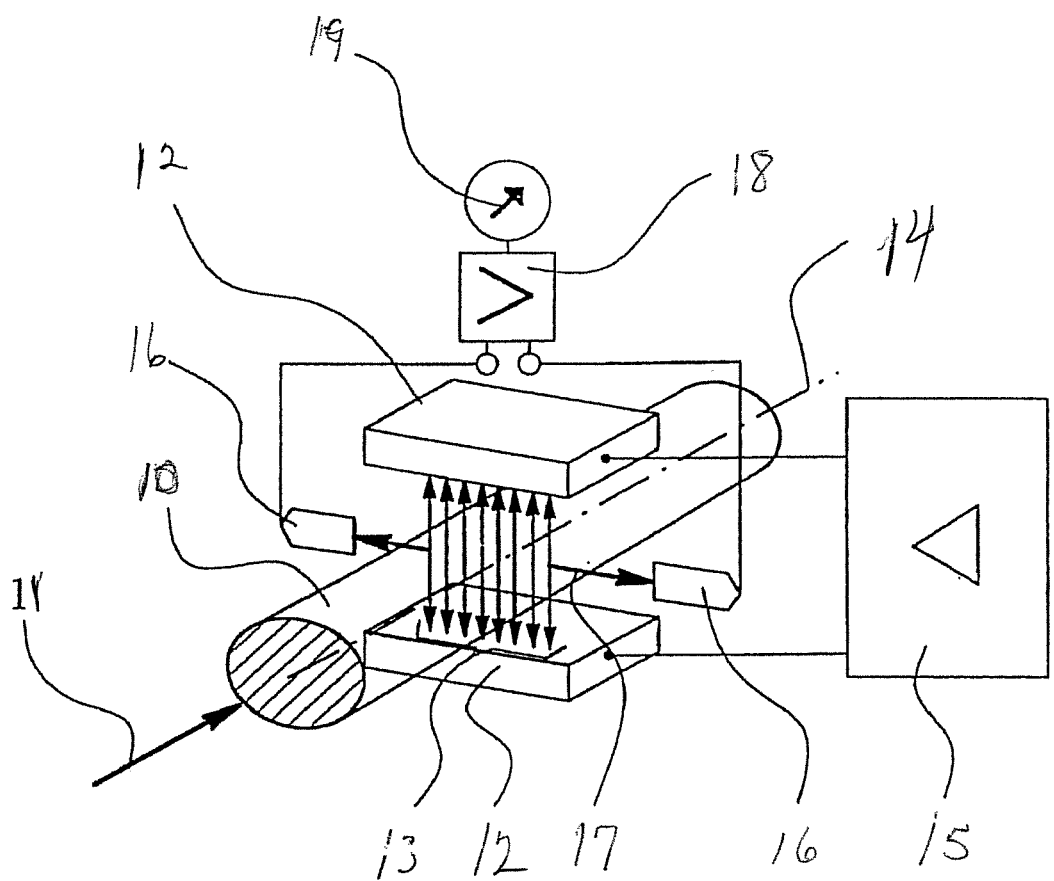
FIG. 5 is a schematic diagram of a prior art magnetoinductive flowmeter to which the present invention is applicable.

As is shown in FIG. 5, a magnetoinductive flowmeter of the type to which the present invention is applicable includes a measuring tube 10 for moving fluids 11, indicated by an arrow, an electromagnet comprised of field coils 12 and serving to generate a magnetic field 13 that extends at least essentially perpendicular to the axis 14 of the measuring tube 10, a power supply 15 serving to feed a switched DC field current I to the field coils 12, two measuring electrodes 16 positioned along a connecting line 17 that extends at least essentially perpendicular to the axis 14 of the measuring tube 10 and to the direction of the magnetic field 13, and a detection circuit 18 serving to analyze the measuring voltage of the measuring electrodes 16 and to generate a flow signal, indicated by an arrow 19.

In this prior art on which this invention is based, magnetoinductive flowmeters include, in addition to the components shown FIG. 5, the magnetic field generator 1 comprises, in addition to at least one field coil 2 (pair of field coils 12), a current regulator 3, a switching bridge 4 and a microcontroller 5. What is not shown is that, instead of a current regulator, a current-measuring resistor can also be provided in series with the field coil 2 (or in series to the field coils 12).

According to the invention, two different coil voltages are provided for the coil power supply, i.e., the coil power supply of the field coil 2 or of two field coils 12, namely an initial voltage and a lower operating voltage. A voltage selector 6 is provided for switching from the initial voltage to the operating voltage and vice versa.

Figure 1:
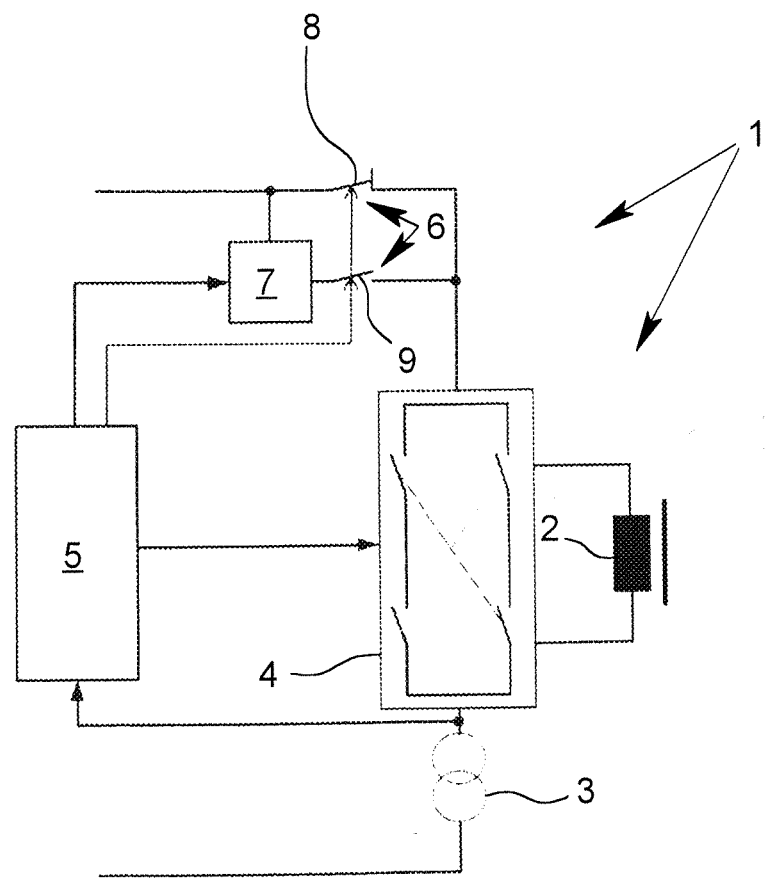
FIG. 1 is a circuit diagram of a preferred embodiment of a magnetic field generator belonging to a magnetic-inductive flowmeter according to the invention, FIG. 2 a first graphic representation, FIG. 3 a second graphic representation, FIG. 4 a third graphic representation.

In the embodiment shown in FIG. 1, the initial voltage is the supply voltage. The operating voltage is obtained from the supply voltage using pulse width modulation. In the embodiment, a PWM-operated switch regulator 7 is provided for generating the operating voltage.

For the embodiment shown in FIG. 1 of a magnetic field generator 1 of a magnetic-inductive flowmeter according to the invention, it is further valid that the switching bridge 4 and the voltage selector 6 are each controlled or actuated by the microcontroller 5.

FIG. 1 shows that the voltage drop is led to the microcontroller 5 via the current regulator 3. The switching bridge 4 is actuated by the microcontroller 5 and the voltage selector 6 is also actuated by the microcontroller 5. Additionally, the microcontroller 5 influences the PWM-operated switch regulator 7—depending on the voltage drop via the current regulator 3—so that the operating voltage has the value that is required, that the coil voltage via the field coil or field coils is so large that the required magnetic field strength is present—in the measuring tube or in the medium flowing through the measuring tube.

Figure 2:
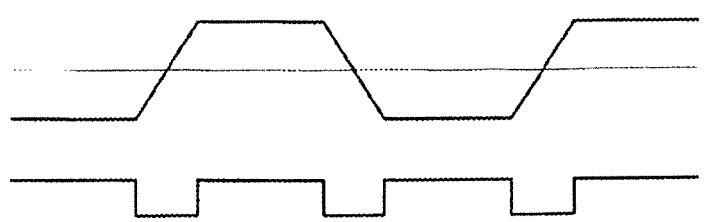

In the embodiment shown in FIG. 1, the voltage selector 6 has an opener 8 and a closer 9. The voltage selector 6 receives its control signal from the microcontroller 5. Without a control signal from the microcontroller 5, the opener 8 is closed and the closer 9 is opened, while the opener 8 is opened and the closer 9 is closed in the presence of a control signal from the microcontroller 5. The interrelations resulting therefrom for the coil current in the field coil 2 are shown by the graphic representation in FIG. 2. In the lower part of this graphic representation, the presence or non-presence of a control signal from the microcontroller is shown, in the upper part of the graphic representation, the coil current flowing in the field coil 2 is shown.

Figure 3:
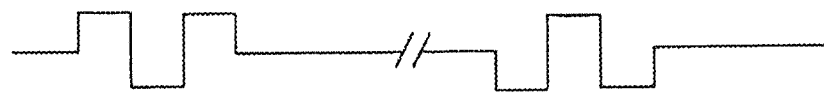

The graphic representation in FIG. 3 shows that the magnetic-inductive flowmeter according to the invention can be operated in pulses in that measurement follows a measuring break, following the break comes another measurement, then a measuring break and a measurement, and so on.

As already described, the microcontroller 5 detects the voltage drop via the current regulator 3 and determines, dependent thereupon, the point of time of switching of the voltage selector 6 and the setting of the PWM switch regulator 7.

Figure 4:
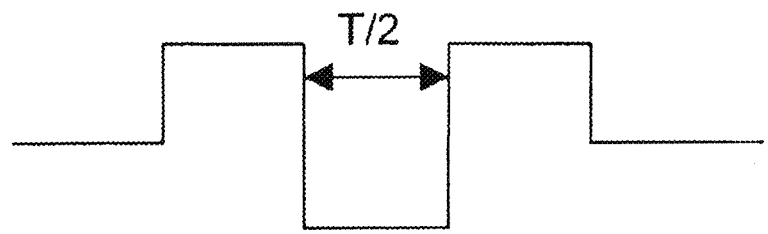
Figure 4:
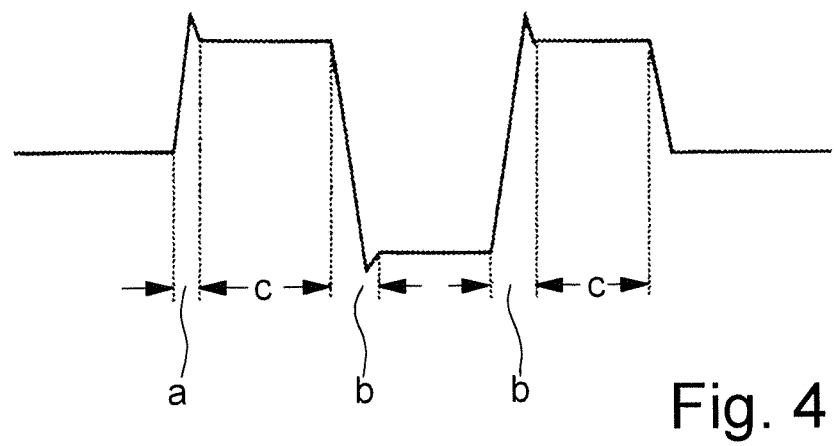

The graphic representation is FIG. 4 shows, idealized, in the upper part, the switched constant current. In the lower part, real conditions are shown. In the time portions a and b, the initial voltage is effective, while the operating voltage is effective in the time portion c. Thereby, the time portion a is less than the time portion b and the time portion that results from the difference of time portion b and time portion a, should be small compared to a half signal duration, i.e., small compared to T/2.

As explained, instead of the current regulator 3 provided in the embodiment according to FIG. 1, a current-measuring resistor can be provided in series with the field coil 2 or field coils. This allows for the possibility of using the voltage drop occurring at the current-measuring resistor as a reference voltage, i.e., to determine to the flow using the measuring electrode voltage at the measuring electrodes and the reference voltage.

What is claimed is:

1. Magnetic-inductive flowmeter, comprising:
   at least one measuring tube for the flow of an electrically conductive medium,
   at least one magnetic field generator for generating an alternating magnetic field running at least also perpendicular to the longitudinal axis of the measuring tube, the magnetic field generator having at least one field coil,
   at least two measuring electrodes in contact with the medium and
   an evaluating circuit,
   coil power supply providing an initial voltage and a lower operating voltage to the at least one field coil,
   a voltage selector for switching from the initial voltage to the operating voltage and vice versa, and
   wherein a PWM actuated switching regulator is provided for generating the operating voltage.

2. Magnetic-inductive flowmeter according to claim 1, wherein the magnetic field generator also comprises a current regulator, a switching bridge and a microcontroller.

3. Magnetic-inductive flowmeter according to claim 1, wherein the initial voltage provided by the coil power supply is the supply voltage.

4. Magnetic-inductive flowmeter, comprising:
   at least one measuring tube for the flow of an electrically conductive medium,
   at least one magnetic field generator for generating an alternating magnetic field running at least also perpendicular to the longitudinal axis of the measuring tube, the magnetic field generator having at least one field coil,
   at least two measuring electrodes in contact with the medium and
   an evaluating circuit,
   coil power supply providing an initial voltage and a lower operating voltage to the at least one field coil,
   a voltage selector for switching from the initial voltage to the operating voltage and vice versa,
   wherein the initial voltage provided by the coil power supply is the supply voltage, and wherein the operating voltage is provided by the coil power supply by pulse width modulation from the supply voltage.

5. Magnetic-inductive flowmeter according to claim 1, wherein the switching bridge is actuated by the microcontroller.

6. Magnetic-inductive flowmeter according to claim 1, wherein the magnetic field generator has a microcontroller, and wherein the voltage selector is actuated by the microcontroller.

7. Magnetic-inductive flowmeter according to claim 1, wherein a current-measuring resistor is provided in series with the at least one field coil.

* * * * *